(12) United States Patent
Sakurai et al.

(10) Patent No.: US 12,381,294 B2
(45) Date of Patent: Aug. 5, 2025

(54) ELECTRODE TERMINAL AND USE THEREOF

(71) Applicant: Prime Planet Energy & Solutions, Inc., Tokyo (JP)

(72) Inventors: Takahiro Sakurai, Nagoya (JP); Kosuke Suzuki, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 62 days.

(21) Appl. No.: 17/589,646

(22) Filed: Jan. 31, 2022

(65) Prior Publication Data

US 2022/0247045 A1  Aug. 4, 2022

(30) Foreign Application Priority Data

Feb. 2, 2021  (JP) .................. 2021-015329

(51) Int. Cl.
*H01M 50/566* (2021.01)
*H01M 50/505* (2021.01)
*H01M 50/516* (2021.01)

(52) U.S. Cl.
CPC ....... *H01M 50/566* (2021.01); *H01M 50/505* (2021.01); *H01M 50/516* (2021.01)

(58) Field of Classification Search
None
See application file for complete search history.

(56) References Cited

U.S. PATENT DOCUMENTS

| 9,680,136 B2 | 6/2017 | Yoo et al. |
| 2011/0244309 A1 | 10/2011 | Byun et al. |
| 2012/0040240 A1* | 2/2012 | Kim ............... H01M 50/55 429/179 |
| 2012/0148908 A1* | 6/2012 | Ito ............... H01M 50/176 29/874 |
| 2014/0178755 A1* | 6/2014 | Oda ............... H01M 50/522 429/211 |
| 2015/0236330 A1* | 8/2015 | Takami ............ H01M 10/0569 429/158 |

(Continued)

FOREIGN PATENT DOCUMENTS

| CN | 106575741 A | 4/2017 |
| CN | 114843716 A | 8/2022 |
| EP | 2463937 A2 | 6/2012 |

(Continued)

OTHER PUBLICATIONS

Machine translation of JP2016207433A (Year: 2016).*

*Primary Examiner* — Brian R Ohara
*Assistant Examiner* — M. T. Leonard
(74) *Attorney, Agent, or Firm* — HAUPTMAN HAM, LLP (57) ABSTRACT

A technology is provided which improves the conductivity at the electrode terminal in a secondary battery. The technology herein disclosed provides an electrode terminal of a secondary battery. The electrode terminal includes a first member made of a metal, and a second member made of a metal. The first member has a connection part to be connected to the second member. The second member has an insertion hole for allowing the connection part of the first member to be inserted thereinto. At the interface between the first member and the second member in the inside of the insertion hole, the first member and the second member are welded to each other.

15 Claims, 11 Drawing Sheets

(56) References Cited

U.S. PATENT DOCUMENTS

2017/0229700 A1* 8/2017 Matsumoto ......... H01M 50/176
2022/0247044 A1  8/2022 Sakurai et al.

FOREIGN PATENT DOCUMENTS

| EP | 3179537 A1 | 6/2017 |
|---|---|---|
| EP | 4037090 A1 | 8/2022 |
| JP | 2011-210725 A | 10/2011 |
| JP | 2014100019 A | 5/2014 |
| JP | 2016-192322 A | 11/2016 |
| JP | 2016-207433 A | 12/2016 |
| WO | 2016/020996 A1 | 2/2016 |

* cited by examiner

ELECTRODE TERMINAL AND USE THEREOF

CROSS REFERENCE TO RELATED APPLICATIONS

The present application claims the priority based on Japanese Patent Application No. 2021-015329 filed on Feb. 2, 2021, the entire contents of which are incorporated by reference in the present specification.

BACKGROUND OF THE DISCLOSURE

1. Technical Field

The present invention relates to an electrode terminal. More particularly, it relates to an electrode terminal of a secondary battery, including two metal members welded to each other, and the use thereof.

2. Background

A secondary battery such as a lithium ion secondary battery is lightweight, and has a high energy density as compared with existing batteries, and accordingly, in recent years, has been preferably used as a power supply to be mounted on a vehicle such as an electric vehicle (EV), a Plug-in Hybrid Electric Vehicle (PHEV), or a Hybrid Electric Vehicle (HEV), or a power supply to be mounted on an electric product such as a personal computer and a portable terminal, or the like.

This kind of secondary battery typically includes an electrode body having a positive electrode and a negative electrode, a battery case for accommodating the electrode body, a positive electrode terminal mounted on the positive electrode, and a negative electrode terminal mounted on the negative electrode. The positive and negative electrode terminals each has a plurality of members, which are mutually connected to form a conductive path. Regarding the connection of the plurality of members, U.S. Pat. No. 9,680,136 proposes that one member and other members are mutually welded.

SUMMARY

Incidentally, as described above, for the formation of the conductive path in the electrode terminal, a plurality of members are used. Concave parts and convex parts are inevitably present on the surface of each member. The concave parts and convex parts may create a fine gap at the interface between respective members. Presence of such a gap may increase the interface resistance between members. These are undesirable because these may hinder the favorable formation of the conductive path in the electrode terminal.

Under such circumstances, the present invention was completed in view of the foregoing circumstances. It is an object of the present invention to provide a technology of improving the conductivity in the electrode terminal of a secondary battery.

The technology herein disclosed provides an electrode terminal of a secondary battery. The electrode terminal includes: a first member made of a metal, and a second member made of a metal. The first member has a connection part to be connected with the second member. The second member has an insertion hole for allowing the connection part of the first member to be inserted thereinto. The first member and the second member are welded to each other at an interface between the first member and the second member situated in an inside of the insertion hole. With the electrode terminal having such a configuration, the interface between the first member and the second member situated in the inside of the insertion hole is welded. As a result, it is possible to reduce a fine gap between the members. For this reason, it is possible to improve the conductivity at the contact interface between the first member and the second member.

In accordance with one preferable aspect of the electrode terminal herein disclosed, the first member and the second member comprise mutually different metals. The resistance at the contact interface between different kinds of metals may be larger than the resistance at the contact interface between the same kind of metals. With the electrode terminal having such a configuration, the improvement of the conductivity can also be implemented at the contact interface between different kinds of metals.

Further, in accordance with another preferable aspect, the insertion hole is a non-through concave part formed in one surface of the second member. With such a configuration, the surface opposite to the insertion hole formation surface of the second member can be set as a flat surface without exposure of the first member and a welding mark. For this reason, in addition to the foregoing effects, it is possible to implement preferable junction between the surface opposite to the insertion hole formation surface of the second member and other members (e.g., a bus bar).

Still further, in accordance with a still other preferable aspect, the connection part is formed in a disk shape. A circumferential edge of the connection part is caulked to an inner wall surface of the insertion hole. By caulking both the members, it is possible to increase the resistance at the portion. As a result of this, the heating value at the portion upon welding can be increased, which can make welding between the first member and the second member easier. Furthermore, caulking can improve the joint strength of both the members.

Furthermore, the technology herein disclosed provides a secondary battery including: an electrode body having a positive electrode and a negative electrode; a battery case for accommodating the electrode body; a positive electrode terminal mounted on the positive electrode; and a negative electrode terminal mounted on the negative electrode. At least any one of the positive electrode terminal and the negative electrode terminal includes the electrode terminal. With the secondary battery having such a configuration, the improvement of the conductivity at the positive electrode terminal and/or the negative electrode terminal is implemented.

Further, the technology herein disclosed provides an assembled battery including a plurality of single cells mutually electrically connected, and arrayed therein. The assembled battery includes the secondary battery as each of the plurality of single cells. With the assembled battery having such a configuration, the improvement of the conductivity in the electrode terminal in at least one single cell is implemented. For this reason, the improvement of performances of the assembled battery is implemented.

In accordance with a preferable aspect, the assembled battery includes: a bus bar for establishing an electric connection between the arrayed single cells. The bus bar is welded in surface contact with a surface of the second member of each of the connected single cells. In a direction orthogonal to a surface direction of a bottom surface of the battery case, the bus bar and the second member are welded on a substantially vertical line of a welded part between the first member and the second member. With the assembled battery having such a configuration, it is possible to more reduce the resistance of the conductive path from the bus bar to the single cell.

DETAILED DESCRIPTION

Below, referring to the accompanying drawings, a preferable embodiment of the technology herein disclosed will be described. Incidentally, matters necessary for executing the present invention, except for matters specifically referred to in the present specification can be grasped as design matters of those skilled in the art based on the related art in the present field. The present invention can be executed based on the contents disclosed in the present specification, and the technical common sense in the present field. Further, in the following respective drawings, the members/sites producing the same effects are given the same reference numerals and signs for description. Further, the dimensional relation in each following drawing (such as length, width, or thickness) does not reflect the actual dimensional relation.

Incidentally, in the present specification, the term "secondary battery" is a term denoting an electric storage device capable of repeatedly charging and discharging in general, and is a concept including a so-called storage battery (chemical battery) such as a lithium ion secondary battery, a sodium ion secondary battery, or a nickel hydrogen battery, and a capacitor (physical battery) such as an electric double layer capacitor. Further, in the present specification, the term "lithium ion secondary battery" denotes a secondary battery using lithium ions as electric charge carriers, and implementing charging and discharging by the transfer of electric charges accompanying transfer of lithium ions between the positive and negative electrodes. Further, in the present specification, "A to B" means "A or more and B or less", and includes more than A and less than B. Further, in the present specification, the wording "mainly including A" denotes including A in an amount of at least 70 wt % based on the total amount of the components.

Figure 1:
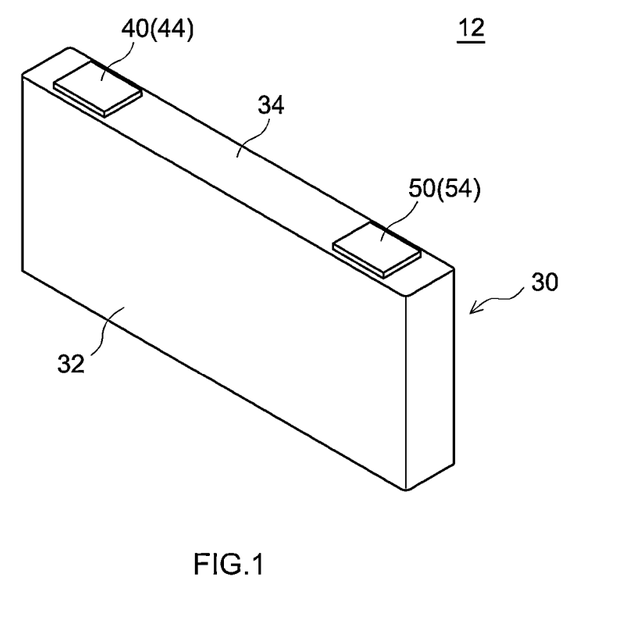
FIG. 1 is a perspective view schematically showing a configuration of a secondary battery including an electrode terminal in accordance with one embodiment.

The secondary battery herein disclosed is a repeatedly chargeable and dischargeable secondary battery, and is, for example, a lithium ion secondary battery. As shown in FIG. 1, a secondary battery 12 broadly has an electrode body (not shown), a nonaqueous electrolyte (not shown), and a battery case 30. The battery case 30 is a flat square container, and has a battery case main body 32 in a shape of a bottomed box having an opening, and a lid body 34 for sealing the opening. The case main body 32 accommodates the electrode body and the nonaqueous electrolyte in the inside thereof. The opening of the case main body 32 and the edge of the lid body 34 are sealed by laser welding or the like. For the battery case 30, for example, a metal material which is lightweight and has a favorable thermal conductivity such as aluminum is used.

Figure 2:
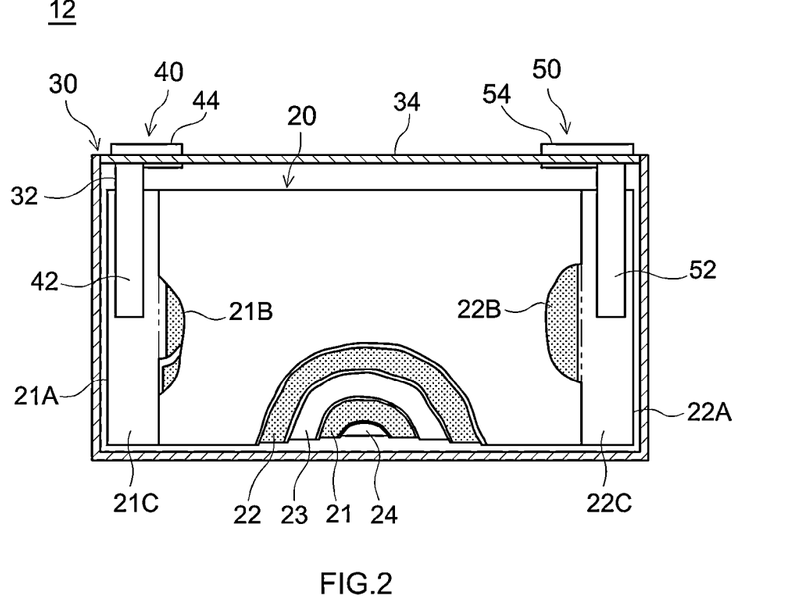
FIG. 2 is a cross sectional view of a wide surface schematically showing a configuration of a secondary battery including an electrode terminal in accordance with one embodiment.

As shown in FIG. 2, an electrode body 20 is a power generating element of the secondary battery 12, and is accommodated in the inside of the battery case 30 while being covered with an insulation film or the like not shown. The electrode body 20 is a wound electrode body including a long sheet-shaped positive electrode sheet 21 and a long sheet-shaped negative electrode sheet 22 wound via separators 23 and 24 in the sheet longitudinal direction. A positive electrode 21 includes a long foil-shaped positive electrode collector 21A, and a positive electrode active material layer 21B formed along the longitudinal direction on one surface or both surfaces of the positive electrode collector 21A. At one side edge of the electrode body 20 in the long side direction of the flat square battery case 30 of the secondary battery 12, there is provided a positive electrode collector exposed part 21C at which the positive electrode active material layer 21B is not formed, and the positive electrode collector 21A is exposed. The positive electrode collector 21A can be, for example, aluminum foil. The positive electrode active material layer 21B includes various materials such as a positive electrode active material, a binder, and a conductive material. The negative electrode 22 includes a long foil-shaped negative electrode collector 22A, and a negative electrode active material layer 22B formed along the longitudinal direction on one surface or both the surfaces of the negative electrode collector 22A. Whereas, at the other side edge of the electrode body 20 in the long side direction, there is provided a negative electrode collector exposed part 22C at which the negative electrode active material layer 22B is not formed, and the negative electrode collector 22A is exposed. The negative electrode collector 22A can be, for example, copper foil. The negative electrode active material layer 22B includes various materials such as a negative electrode active material and a binder. The separators 23 and 24 are resin sheets each interposed between the positive electrode 21 and the negative electrode 22, and for preventing the direct contact between these electrodes. As the constituent materials of the positive electrode active material layer 21B, the negative electrode active material layer 22B, and the separator, the materials for use in this kind of secondary battery can be used without particular restriction, and do not characterize the present invention, and hence will not be described herein.

Figure 3:
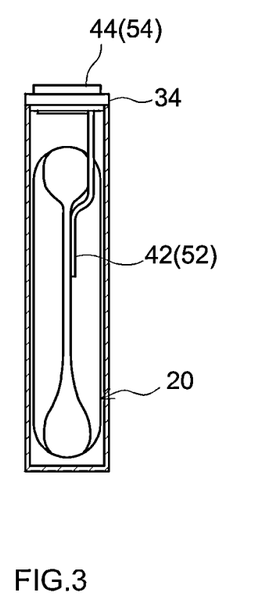
FIG. 3 is a cross sectional view of a narrow surface schematically showing a configuration of a secondary battery including an electrode terminal in accordance with one embodiment.

As shown in FIGS. 1 to 3, the battery case 30 (lid body 34) includes a positive electrode terminal 40 and a negative electrode terminal 50. The positive electrode terminal 40 includes a positive electrode connection terminal 44, and a positive electrode collector terminal 42. The positive electrode connection terminal 44 has a side to be arranged on the case outer surface of the lid body 34, and a site to be arranged in the case inside. The positive electrode connection terminal 44 is connected to the positive electrode collector terminal 42 in the inside of the battery case 30. The positive electrode collector terminal 42 is connected to the positive electrode collector exposed part 21C. The negative electrode terminal 50 includes a negative electrode connection terminal 54 and a negative electrode collector terminal 52. The negative electrode connection terminal 54 has a site to be arranged on the case outer surface of the lid body 34, and a site to be arranged in the case inside. The negative electrode connection terminal 54 is connected to the negative electrode collector terminal 52 in the inside of the battery case 30. The negative electrode collector terminal 52 is connected to the negative electrode collector exposed part 22C.

In the secondary battery 12, at least any one of the positive electrode connection terminal 44 and the negative electrode connection terminal 54 includes the electrode terminal herein disclosed. Below, a description will be given to the case where the negative electrode connection terminal 54 is the electrode terminal herein disclosed. Incidentally, the same also applies to the case where the positive electrode connection terminal 44 is the electrode terminal herein disclosed, and hence a detailed description thereon will be omitted.

Figure 4:
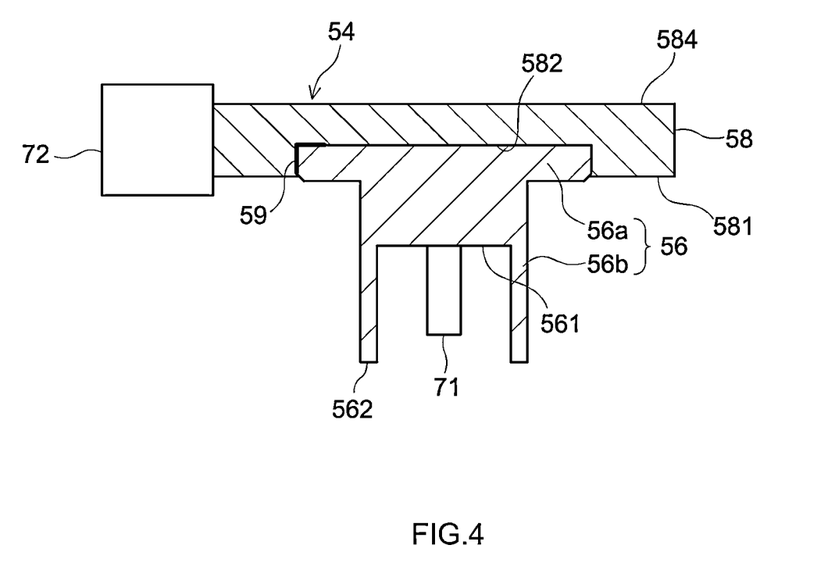
FIG. 4 is a schematic view for illustrating resistance welding in manufacturing of an electrode terminal in accordance with one embodiment.
Figure 5:
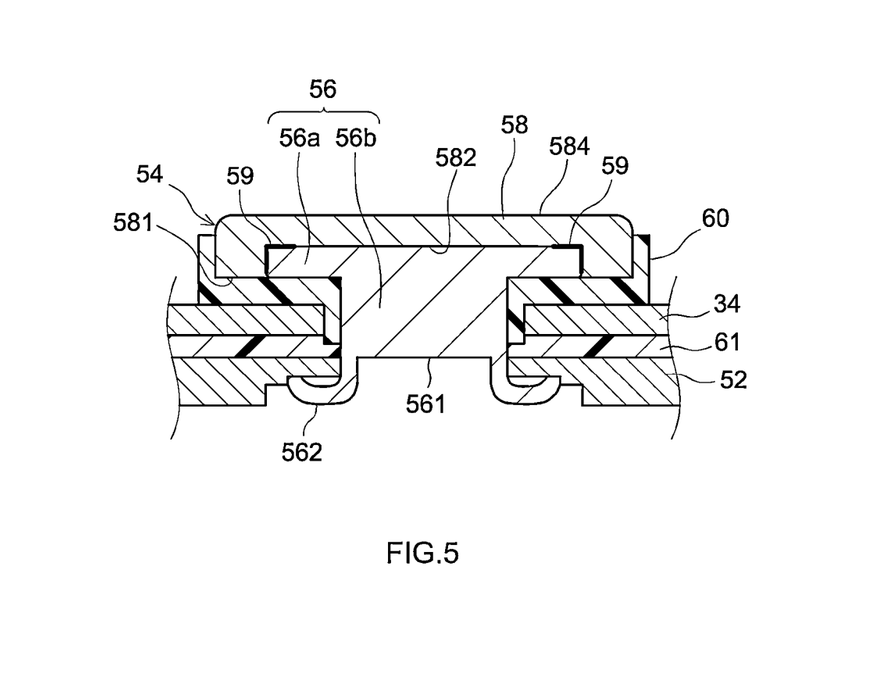
FIG. 5 is an essential part cross sectional view schematically showing the vicinity of a negative electrode terminal of a secondary battery including an electrode terminal in accordance with one embodiment.

As shown in FIGS. 4 and 5, the negative electrode connection terminal 54 includes a first member 56 made of a metal, and a second member 58 made of a metal. The first member 56 includes a disk-shaped connection part 56a, and a cylindrical shaft part 56b. The second member 58 is formed in a flat sheet shape, and an insertion hole 582 of a non-through concave part is formed in one surface 581 in the thickness direction of the second member 58 (which will be also hereinafter referred to as a "lower surface 581 of the second member 58". The circumferential edge of the connection part 56a of the first member 56 is caulked to the inner wall surface of the insertion hole 582. Herein, the wording "the circumferential edge of the connection part 56a of the first member 56 is caulked to the inner wall surface of the insertion hole 582" denotes, for example, the state in which the circumferential edge of the connection part 56a of the first member 56 is pressure welded to the inner wall surface of the insertion hole 582, so that the first member 56 is fixed to the second member 58. As described above, the insertion hole 582 is non-through. For this reason, the connection part 56a is not exposed to the outside from the other surface 584 in the thickness direction (which will be also hereinafter referred to as the "upper surface 584 of the second member 58". For this reason, other members (e.g., the bus bar) can be more readily joined to the upper surface 584. Further, the upper surface 584 includes a single material, and hence can improve the joint strength with other members.

The circumferential edge of the connection part 56a and the inner wall surface of the insertion hole 582 are mutually welded at the interface therebetween, thereby forming a welded part 59. With the connection part 56a inserted into the inside of the insertion hole 582, namely, in the inside of the insertion hole 582, the interface between the first member 56 and the second member 58 is welded, thereby reducing the resistance at the interface, and the gap between the first member 56 and the second member 58 is reduced. As a result, the conductivity from the first member 56 to the second member 58 can be improved. Further, welding at the interface between the circumferential edge of the connection part 56a and the inner wall surface of the insertion hole 582 is also preferable from the viewpoint of improving the joint strength between the first member 56 and the second member 58 in addition to the conductivity improvement.

Although not particularly restricted, the first member 56 and the second member 58 can include aluminum, an alloy mainly including aluminum, copper, or an alloy mainly including copper. The metal forming the first member 56 and the metal forming the second member 58 may be the same, or may be different. From the viewpoint of connection with a bus bar described later, the second member 58 preferably includes aluminum or an alloy mainly including aluminum. From the viewpoint of connection with the negative electrode collector, the first member preferably includes copper or an alloy mainly including copper. In one preferable example, the second member 56 includes aluminum, and the first member 58 includes copper.

The negative electrode connection terminal 54 can be broadly manufactured by stacking the first member 56 and the second member 58 one on another, and subjecting the interface between both the members to resistance welding. First, as shown in FIG. 4, the circumferential edge of the connection part 56a of the first member 56 is caulked to the inner wall surface of the insertion hole 582. Then, the concave part 561 of the first member 56 is brought into contact with a welding probe 71 (electrode), and the circumferential edge of the second member 58 is brought into contact with a welding probe 72 (the other electrode), thereby passing a current between the welding probe 71 and the welding probe 72. In that way, in the inside of the insertion hole 582, the interface between the connection part 56a and the inner wall surface of the insertion hole 582 generates heat due to the resistance at the time of passing a current therethrough. The heat generation can weld the interface, and can form the welded part 59. Incidentally, the welded part 59 may only be formed on at least a part of the inner wall surface of the insertion hole 582, and is preferably formed on the entire surface of the inner wall surface of the insertion hole 582 from the viewpoints of conductivity improvement and the joint strength improvement. By performing resistance welding while appropriately moving the welding probe 72 along the circumferential edge of the second member 58, the welded part 59 can be formed entirely on the inner wall surface of the insertion hole 582. By using resistance welding, it is possible to weld both the members without forming a welding mark on the surface of the second member 58. Especially, implementation of welding of the first member 56 and the second member 58 without formation of a welding mark on the upper surface 584 is preferable for joining other members (such as a bus bar) to the upper surface 584. Incidentally, the conditions of resistance welding (such as the magnitude of the welding current and the welding time) have no particular restriction, and can be appropriately changed.

Then, a description will be given to mounting of the negative electrode connection terminal 54 with the foregoing configuration to the secondary battery. As shown in FIG. 5, in the secondary battery 12, from the outside of the battery case 30, the shaft part 56b of the first member 56 is inserted into through holes respectively provided in respective members in the order of a gasket 60, a lid body 34, an insulator 61, and the negative electrode collector terminal 52, and a tip 562 is caulked in the inside of the battery case 30. A caulked part in a ring shape in a plan view is formed at the circumferential edge portion of the though hole of the negative electrode collector terminal 52. The gasket 60 is a member for insulating the negative electrode connection terminal 54 and the lid body 34, and is formed of a material having an insulation property (e.g., a fluorine resin such as perfluoroalkoxy alkane (PFA)). The insulator 61 is a member for insulating the lid body 34 and the negative electrode collector terminal 52, and is formed of a material having an insulation property and an electrolyte resistance (e.g., a resin material such as polyphenylene sulfide resin (PPS)).

Figure 6:
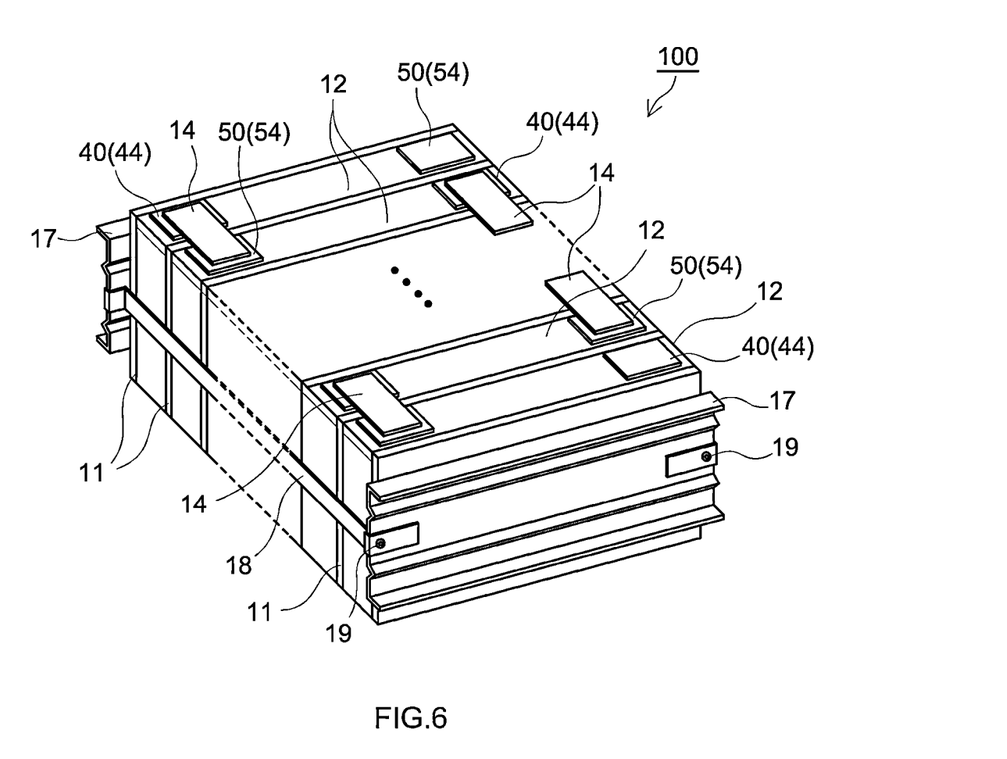
FIG. 6 is a perspective view schematically showing a configuration of an assembled battery including a secondary battery including an electrode terminal in accordance with one embodiment as a single cell.

The secondary battery 12 can be used as a single cell forming an assembled battery as shown in FIG. 6. As shown, an assembled battery 100 broadly includes a plurality of secondary batteries 12 (which will also be hereinafter referred to as "single cells 12"), a spacer 11, a bus bar 14, and an end plate 17. The plurality of single cells 12 are arranged along a prescribed direction with the spacers 11 each interposed between respective single cells so that the flat surfaces of the single cells 12 are opposed to each other. The end plates 17 are arranged at the opposite ends in the array direction of the single cells 12, respectively, and sandwich the plurality of arrayed single cells 12 in the same direction. Respective end plates 17 are bridged by a binding band 18 made of a metal, and the end of the binding band 18 is fastened and fixed by a screw 19.

Figure 7:
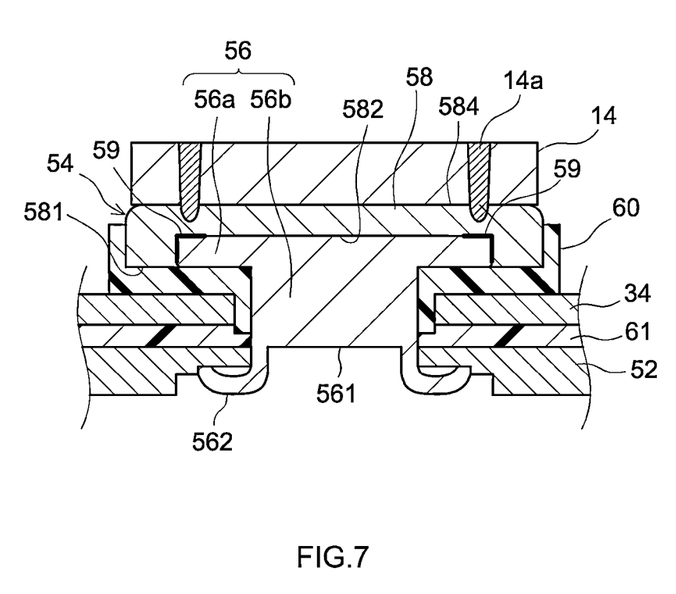
FIG. 7 is an essential part cross sectional view schematically showing the vicinity of a bus bar connection site in the assembled battery having a secondary battery including an electrode terminal in accordance with one embodiment.

As shown, the positive electrode terminal 40 of one single cell 12 and the negative electrode terminal 50 of the other single cell 12 adjacent to the single cell are electrically connected with each other by the flat sheet-shaped bus bar 14. The bus bar 14 is welded to the positive electrode connection terminal 44 and the negative electrode connection terminal 54 by laser welding, or the like. As shown in FIG. 7, the bus bar 14 is welded to the upper surface 584 of the second member 58, so that a welded part 14a is formed. The bus bar 14 and the second member 58 have no particular restriction so long as both the members can be joined with each other with a sufficient strength. From the viewpoint of improving the conductivity between the bus bar 14 and the negative electrode terminal 50, the distance between the welded part 14a of the bus bar 14 and the second member 58, and the welded part 59 of the first member 56 and the second member 58 is preferably shortened. In the direction orthogonal to the plane direction of the bottom surface of the battery case 30 (i.e., the extension direction of the shaft part 56b), the bus bar 14 and the second member 58 are preferably welded on a substantially vertical line to the welded part 59 between the first member 56 and the second member 58. Herein, in the present specification, the wording "being welded on a substantially vertical line" denotes that the welded part 14a between the bus bar 14 and the second member 58 is formed above the circular region with a radius of 5 mm or less (preferably 3 mm or less) with the welded part 59 between the first member 56 and the second member 58 as the center.

The bus bar 14 can include a metal such as aluminum, copper, nickel, or stainless steel. From the viewpoint of improving the joint strength and the conductivity with the second member 58, the bus bar 14 preferably includes the same metal as the metal of the second member 58. For example, when the second member 58 is made of aluminum, the bus bar 14 is preferably also made of aluminum. Incidentally, the shape of the bus bar 14 has no particular restriction. For example, a cylindrical one may be used.

The assembled battery 100 is usable for various uses, and can be preferably used as, for example, a power source (driving power supply) for a motor to be mounted on a car. The kind of the car has no particular restriction. Typically, mention may be made of a vehicle such as a Plug-in hybrid Electric Vehicle (PHEV), a Hybrid Electric Vehicle (HEV), or an electric vehicle (EV).

Up to this point, specific examples of the present invention have been described in details. However, the embodiments are merely illustrative, and should not be construed as limiting the scope of the appended claims. The technology described in the appended claims includes various modifications and changes of the specific examples shown up to this point. Also in the modified examples shown below, the same effects as those of the embodiments can be obtained. For example, in the embodiments, the circumferential edge of the connection part 56a of the first member 56 is caulked to the inner wall surface of the insertion hole 582. However, the present invention is not limited thereto, and caulking is not required to be performed. In this case, with the connection part inserted into the insertion hole, resistance welding is performed. As a result, it is possible to perform welding of the first member and the second member.

Figure 8:
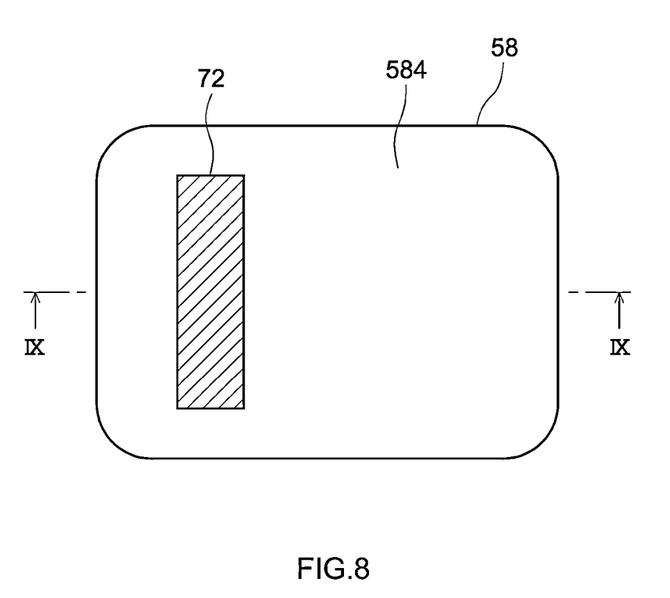
FIG. 8 is a view for illustrating resistance welding in manufacturing of an electrode terminal in accordance with one modified example, and showing the state in which a welding probe is in contact with the surface of a second member as seen from above the surface.
Figure 9:
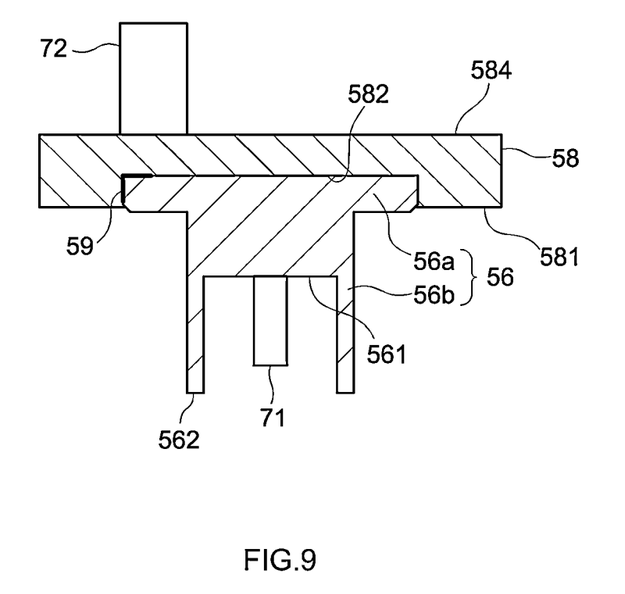
FIG. 9 is a cross sectional view along IX-IX of FIG. 8.

Further, in the embodiment, for joining the first member 56 and the second member 58, the welding probe was brought into contact with each of the concave part 561 of the first member 56 and the circumferential edge of the second member 58, but the present invention is not limited thereto. As shown in FIGS. 8 and 9, with the welding probe 71 brought into contact with the concave part 561 of the first member 56, and with the welding probe 72 brought into contact with the upper surface 584 of the second member 58, resistance welding may be performed. In this case, the welded part 59 can be formed substantially vertically under the welding probe 72. As a result of this, it is possible to reduce the gap at the interface between the first member 56 and the second member 58. Further, a welding mark is not formed on the upper surface 584. For this reason, it is possible to perform welding of the upper surface 584 and the bus bar 14 with ease, and it is possible to improve the joint strength. Incidentally, the contact site of the welding probe 72 is not limited to the site shown in FIGS. 8 and 9, and may be appropriately moved, if required.

Figure 10:
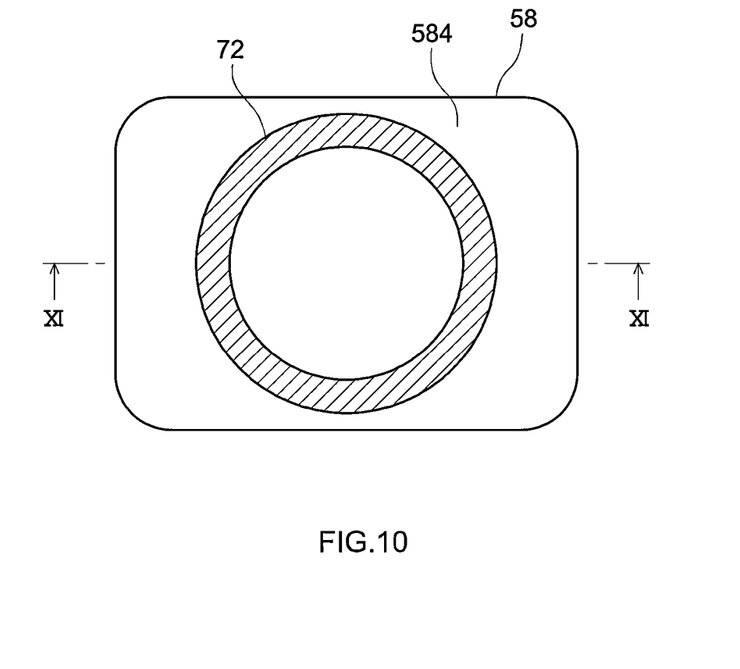
FIG. 10 is a view for illustrating resistance welding in manufacturing of an electrode terminal in accordance with one modified example, and showing the state in which a welding probe is in contact with the surface of a second member as seen from above the surface.
Figure 11:
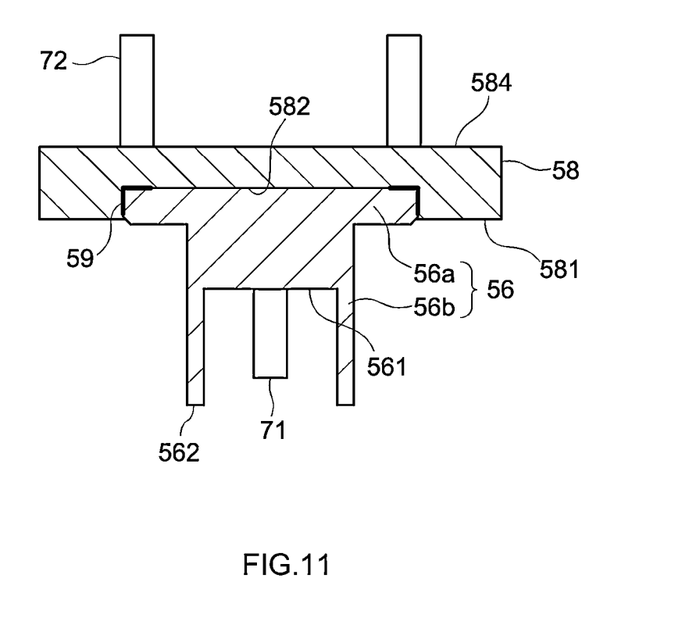
FIG. 11 is a cross sectional view along XI-XI of FIG. 10.

Alternatively, as shown in FIGS. 10 and 11, as the welding probe 72, the one in a ring-shape in cross section may be used. In this case, the welded part 59 can be formed substantially vertically under the welding probe 72. In the present modified example, from the viewpoint of preventing the deviation of the surface pressure from the welding probe 72 applied on the upper surface 584 of the second member 58, the welding probe 71 is preferably arranged at the position such that the distances from the welding probe 72 are equal.

Figure 12:
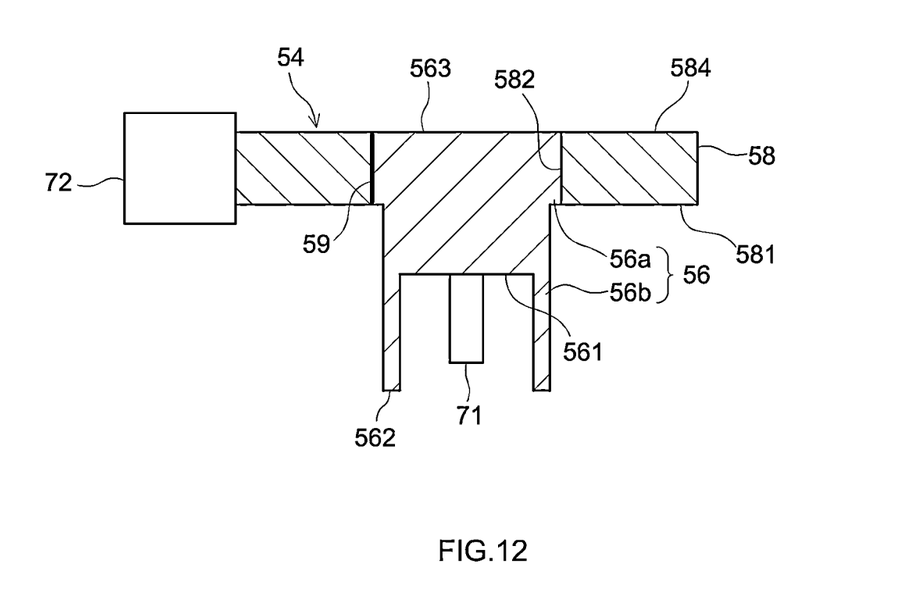
FIG. 12 is a cross sectional view schematically showing an electrode terminal in accordance with one modified example.

Further, in the embodiment, the insertion hole 582 is a non-through concave part. However, the present invention is not limited thereto, and a through hole is also acceptable. As shown in FIG. 12, the tip 563 outside the battery case 30 in the insertion direction of the connection part 56a into the insertion hole 582 can be more exposed to the outside than the upper surface 584 of the second member 58. For joining the first member 56 and the second member 58, with the welding probe 71 brought into contact with the concave part 561 of the first member 56, and with the welding probe 72 brought into contact with the circumferential edge of the second member 58, resistance welding is performed. As a result, the welded part 59 can be formed at the site shown. Incidentally, caulking processing may be carried out in which the tip 563 of the first member 56 is more protruded to the outside than the upper surface 584 of the second member 58 for compressive deformation into a hat shape.

Further, in the embodiment, the diameter of the connection part 56a in a plan view is larger than the diameter of the shaft part 56b. However, the present invention is not limited thereto. The diameter of the connection part 56a and the diameter of the shaft part 56b may be set to be equal to each other.

What is claimed is:

1. An electrode terminal of a secondary battery, the electrode terminal comprising:
    a first member made of a metal, and
    a second member which is in a flat sheet shape and made of a metal;
  wherein
  the first member has
    a disk-shaped connection part to be connected with the second member, and
    a cylindrical shaft part which extends from the disk-shaped connection part in a thickness direction of the second member,
  the first member is made of copper, or an alloy including copper in an amount of at least 70 wt % based on a total amount of components,
  the second member has an insertion hole configured to allow the disk-shaped connection part of the first member to be inserted thereinto,
  the insertion hole is a non-through concave part formed in one surface of the second member,
  the non-through concave part has a bottom portion facing towards the disk-shaped connection part and continuously extending over a center of the disk-shaped connection part,
  the second member is made of aluminum, or an alloy including aluminum in an amount of at least 70 wt % based on a total amount of components,
  the disk-shaped connection part has an upper portion and a lower portion from which the cylindrical shaft part extends, the upper portion being opposite to the lower portion, and
  the first member and the second member are resistance-welded to each other at an interface between a circumferential edge of the disk-shaped connection part of the first member and an inner wall surface of the insertion hole of the second member and at a further interface between the upper portion of the disk-shaped connection part of the first member and the bottom portion of the non-through concave part, in a state where the disk-shaped connection part of the first member is inside the insertion hole and the cylindrical shaft part is outside the insertion hole, the further interface excluding a center part overlapping the center of the disk-shaped connection part in the thickness direction.

2. The electrode terminal according to claim 1, wherein the circumferential edge of the disk-shaped connection part is caulked to the inner wall surface of the insertion hole of the second member.

3. A secondary battery, comprising:
    an electrode body having a positive electrode and a negative electrode;
    a battery case accommodating the electrode body;
    a positive electrode terminal mounted on the positive electrode; and
    a negative electrode terminal mounted on the negative electrode,
  wherein
  the negative electrode terminal comprises
    a first member made of copper, or an alloy including copper in an amount of at least 70 wt % based on a total amount of components, and
    a second member which is in a flat sheet shape and made of aluminum, or an alloy including aluminum in an amount of at least 70 wt % based on a total amount of components;
  wherein
  the first member has
    a disk-shaped connection part to be connected with the second member, and
    a cylindrical shaft part which extends from the disk-shaped connection part in a thickness direction of the second member,
  the second member has an insertion hole configured to allow the disk-shaped connection part of the first member to be inserted thereinto,
  the insertion hole is a non-through concave part formed in one surface of the second member,
  the non-through concave part has a bottom portion facing towards the disk-shaped connection part and continuously extending over a center of the disk-shaped connection part,
  the disk-shaped connection part has an upper portion and a lower portion from which the cylindrical shaft part extends, the upper portion being opposite to the lower portion, and
  the first member and the second member are resistance-welded to each other at an interface between-a circumferential edge of the disk-shaped connection part of the first member and an inner wall surface of the insertion hole of the second member and at a further interface between the upper portion of the disk-shaped connection part of the first member and the bottom portion of the non-through concave part, in a state where the disk-shaped connection part of the first member is inside the insertion hole and the cylindrical shaft part is outside the insertion hole, the further interface excluding a center part overlapping the center of the disk-shaped connection part in the thickness direction.

4. An assembled battery, comprising:
a plurality of single cells mutually electrically connected with each other, and arrayed therein, and
a bus bar establishing an electrical connection between the arrayed single cells,
wherein
each of the plurality of single cells is a secondary battery,
the secondary battery includes:
    an electrode body having a positive electrode and a negative electrode;
    a battery case accommodating the electrode body;
    a positive electrode terminal mounted on the positive electrode; and
    a negative electrode terminal mounted on the negative electrode, the negative electrode terminal comprises
    a first member made of copper, or an alloy including copper in an amount of at least 70 wt % based on a total amount of components, and
    a second member which is in a flat sheet shape and made of aluminum, or an alloy including aluminum in an amount of at least 70 wt % based on a total amount of components;
the first member has
    a disk-shaped connection part to be connected with the second member, and
    a cylindrical shaft part which extends from the disk-shaped connection part in a thickness direction of the second member,
the second member has an insertion hole configured to allow the disk-shaped connection part of the first member to be inserted thereinto,
the insertion hole is a non-through concave part formed in one surface of the second member,
the non-through concave part has a bottom portion facing towards the disk-shaped connection part and continuously extending over a center of the disk-shaped connection part,
the disk-shaped connection part has an upper portion and a lower portion from which the cylindrical shaft part extends, the upper portion being opposite to the lower portion,
the first member and the second member are resistance-welded to each other at an interface between a circumferential edge of the disk-shaped connection part of the first member and an inner wall surface of the insertion hole of the second member and at a further interface between the upper portion of the disk-shaped connection part of the first member and the bottom portion of the non-through concave part, in a state where the disk-shaped connection part of the first member is inside the insertion hole and the cylindrical shaft part is outside the insertion hole, the further interface excluding a center part overlapping the center of the disk-shaped connection part in the thickness direction,
the bus bar is made of aluminum, or an alloy including aluminum in an amount of at least 70 wt % based on a total amount of components,
the bus bar is welded in surface contact with a surface of the second member of each of the connected single cells, and
a welded part of the bus bar and the second member and a welded part of the first member and the second member are aligned on a same line which is orthogonal to a bottom surface of the battery case.

5. The electrode terminal according to claim 1, wherein the first member and the second member are resistance-welded to each other at an entirety of the interface between the circumferential edge of the disk-shaped connection part of the first member and the inner wall surface of the insertion hole of the second member.

6. The electrode terminal according to claim 1, wherein the second member has
    a first surface defined by the one surface including the non-through concave part, and
    a second surface that is opposite to the first surface of the second member in the thickness direction of the second member and is a flat surface, without exposure of the first member and a welding mark between the first member and the second member.

7. The electrode terminal according to claim 5, wherein the second member has
    a first surface defined by the one surface including the non-through concave part, and
    a second surface that is opposite to the first surface of the second member in the thickness direction of the second member and is a flat surface, without exposure of the first member and a welding mark between the first member and the second member.

8. The electrode terminal according to claim 1, wherein the further interface is contiguous with the interface.

9. The electrode terminal according to claim 1, wherein the second member is a single piece.

10. The electrode terminal according to claim 9, wherein the single piece of the second member is made of aluminum.

11. The electrode terminal according to claim 10, wherein copper in the first member and aluminum in the single piece of the second member are directly resistance-welded to each other at the interface between the circumferential edge of the disk-shaped connection part of the first member and the inner wall surface of the insertion hole of the second member, in the state where the disk-shaped connection part of the first member is inside the insertion hole and the cylindrical shaft part is outside the insertion hole.

12. The electrode terminal according to claim 11, wherein copper in the first member and aluminum in the single piece of the second member are directly resistance-welded to each other at the further interface between the upper portion of the disk-shaped connection part of the first member and the bottom portion of the non-through concave part, in the state where the disk-shaped connection part of the first member is inside the insertion hole and the cylindrical shaft part is outside the insertion hole.

13. The electrode terminal according to claim 1, wherein copper or the alloy including copper in the first member and aluminum or the alloy including aluminum in the second member are directly resistance-welded to each other at the interface between the circumferential edge of the disk-shaped connection part of the first member and the inner wall surface of the insertion hole of the second member, in the state where the disk-shaped connection part of the first member is inside the insertion hole and the cylindrical shaft part is outside the insertion hole.

14. The electrode terminal according to claim 13, wherein copper or the alloy including copper in the first member and aluminum or the alloy including aluminum in the second member are directly resistance-welded to each other at the further interface between the upper portion of the disk-shaped connection part of the first member and the bottom portion of the non-through concave part, in the state where the disk-shaped connection part of the first member is inside the insertion hole and the cylindrical shaft part is outside the insertion hole.

15. The assembled battery according to claim 4, wherein the one surface of the second member is opposite to the surface of the second member in the thickness of the second member.

* * * * *